US006694015B1

United States Patent
Byers et al.

(10) Patent No.: US 6,694,015 B1
(45) Date of Patent: Feb. 17, 2004

(54) UNIVERSAL LINE INTERFACE IN TELECOMMUNICATIONS SYSTEM

(76) Inventors: Charles Calvin Byers, 3203 Bremerton La., Aurora, IL (US) 60504; Mark Alan Lassig, 1563 Selby Rd., Naperville, IL (US) 60563; Carl Robert Posthuma, 1309 Lowden Ave., Wheaton, IL (US) 60187

( * ) Notice: Subject to any disclaimer, the term of this patent is extended or adjusted under 35 U.S.C. 154(b) by 0 days.

(21) Appl. No.: 09/519,813

(22) Filed: Mar. 6, 2000

(51) Int. Cl.[7] .............................. H04M 1/00; H04M 9/00
(52) U.S. Cl. .............................. 379/399.01; 379/22.03; 379/27.01; 379/402; 379/413.02
(58) Field of Search ..................... 379/90.01, 93.01, 379/93.05, 93.06, 93.07, 93.09, 93.11, 399.01, 399.02, 413.02, 1.01, 22.03, 26.01, 26.02, 27.01

(56) References Cited

U.S. PATENT DOCUMENTS

| | | | | |
|---|---|---|---|---|
| 5,088,089 A | * | 2/1992 | Gingell et al. | 370/363 |
| 5,253,291 A | * | 10/1993 | Naseer et al. | 379/406.06 |
| 5,267,309 A | * | 11/1993 | Sanders et al. | 379/413.02 |
| 5,323,460 A | * | 6/1994 | Warner et al. | 379/399.01 |
| 5,500,894 A | | 3/1996 | Hershbarger | 379/399 |
| 5,881,129 A | * | 3/1999 | Chen et al. | 379/26.02 |
| 6,195,414 B1 | * | 2/2001 | Simmons et al. | 379/22 |
| 6,507,585 B1 | * | 1/2003 | Dobson | 370/420 |

FOREIGN PATENT DOCUMENTS

| | | | |
|---|---|---|---|
| EP | 0503528 A3 | 9/1992 | .......... H04M/19/00 |
| WO | 99/34581 | 7/1999 | ............ H04M/3/00 |

OTHER PUBLICATIONS

"Signal–processing chips enrich telephone line–card architecture", by Russel Apfel. Hadi Ibrahim and Ron Ruebush dated May 5, 1982, 6 pages, published in *Electronics*, SN, JP. vol. 55, No. 9.

"A Monolithic Line Card Circuit" by Ian L. McWalter, Handi El–Sissi, Anthony K. D. Brown, Puran S. Kasbia, Karl Siemens and Robert W. Wallace dated May 17, 1982, 4 pages, published in Proceedings of the Custom Integrated Circuits Conference, XX, XX.

* cited by examiner

*Primary Examiner*—Binh Tieu

(57) ABSTRACT

A universal line card architecture includes core circuitry for performing battery, overvoltage, ringing, supervision, coder/decoder circuit (CODEC), hybrid and test (BORSCHT) functions interconnected to a control processor and processing system. The control processor and processing system serve a plurality of line cards and are configurable to one or more of a plurality of subscriber loop standards in which the line card can operate. Upon receipt of instructions from a configuration system, the processing system configures line card and core network interface elements so that an appropriate subscriber loop standard may be associated with the line card identified in the provisioning request.

7 Claims, 3 Drawing Sheets

UNIVERSAL LINE INTERFACE IN TELECOMMUNICATIONS SYSTEM

TECHNICAL FIELD

This invention relates to telecommunications networks, and more particularly, to line interface units interconnecting customer premises equipment and subscriber lines to such telecommunications networks.

BACKGROUND OF THE INVENTION

The information age has ushered in an explosive growth of data networking systems, as evidenced by the popularity of the Internet. It is consumer demand for accurate information delivered substantially instantaneously that is the impetus for an evolution of the types of service offered by telecommunications service providers.

Although the traditional provider of telecommunications services is a regional Bell operating company (also known as an RBOC), modem day telecommunications service providers can take various forms. For example, an Internet service provider may provide telephone service and act as a portal for subscriber access to various data networks. Regardless of the identity of the telecommunications service provider, access to customer premises equipment via a subscriber line is critical. Line interface units (or line cards) are the interface between a subscriber line and the serving telecommunications equipment.

All line cards provide basic functions such as battery feed, overvoltage, ringing, supervision, coder/decoder circuit (known as CODEC), hybrid and testing (known as the BORSCHT function). However, supplemental line card functions are required, depending upon the service standard with which the subscriber loop operates. Traditional analog service (i.e., plain old telephone service or "POTS") is quickly becoming an anomaly in a sea of sophisticated subscriber loop standards such as ISDN, coin, HDSL, ADSL, VDSL, SDSL and 10 base T. Currently, telecommunications service providers operating switches or loop carriers require many different types of line cards for supporting the various types of subscriber loop standards available.

Supporting a plurality of line card types leads to operational difficulties including reduced efficiency of switch terminations, stockpiling of inventory and increased costs associated with moving subscriber lines among the different types of line cards when a service change is requested. For example, if a telecommunications service subscriber wishes to upgrade from POTS to a more advanced type of service, such as ISDN, a technician must physically access the subscriber's line card to upgrade circuitry or switch the subscriber line termination to an ISDN-capable line card. Manual upgrading of line cards is time consuming and labor intensive. With anticipated increases in subscriber requests for more sophisticated service, it is likely that significant service provider resources continue to be occupied with line card upgrade activities.

SUMMARY OF THE INVENTION

The need for a more robust and adaptable line card architecture is recognized and a technological advance is achieved in the telecommunications art by a universal telecommunications line card for serving various types of subscriber loop standards. More particularly, the universal line card design employs a core circuit comprising a high performance CODEC and digital signal processor for allowing selective configuration of the line card interface for serving a subset of a plurality of subscriber loop standards.

The core circuit of the line card interfaces with the metallic twisted pair of the subscriber loop. This interface is connected to the codec circuit which performs analog to digital (and digital to analog) conversions. The codec is also interconnected to a digital signal processor initialized with different algorithms for serving a variety of subscriber loop standards. The digital signal processor is interconnected to a telecommunications network and is capable of passing signals as either timeslots or packets. The core circuit performs all BORSCHT functions required by all subscriber loop standards. Some line cards may also be able to support special high current pulses for operating coin phones and other 'specialized telemetry. All the universal line cards include variable termination impedance matching networks for providing the different line characteristics required by the different subscriber loop standards. When implementing a particular standard format, some functions on the universal line card are disabled so as not to interfere with transmission.

Advantageously, the universal line card is configurable to accommodate various bandwidth, feature and range requirements of an individual subscriber line. For example, POTS can be combined with ISDN and ADSL services on the same line card. Further, the line card can be configured via a remote system so that the need for a technician to upgrade line card services is no longer required.

DETAILED DESCRIPTION

Figure 1:
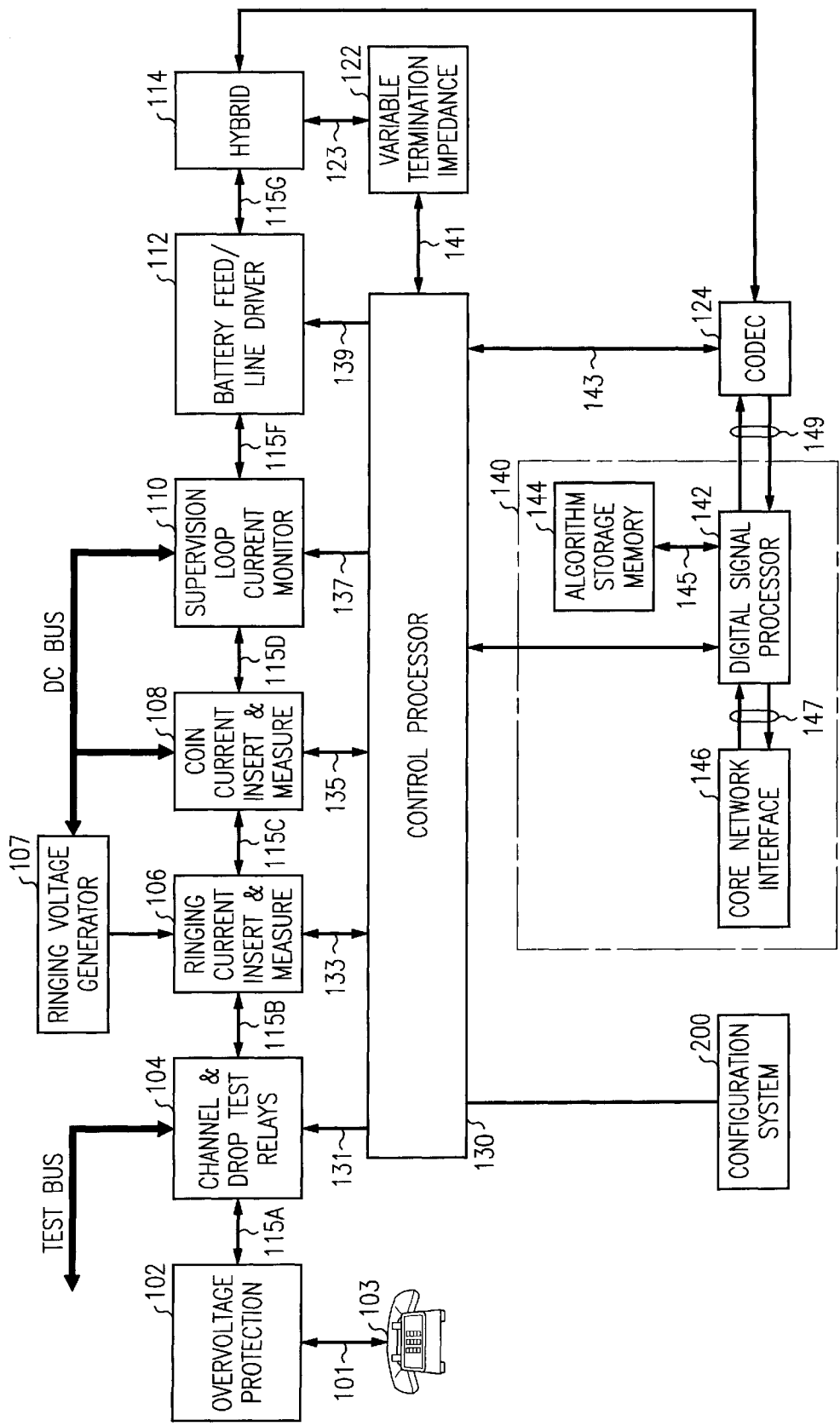
FIG. 1 is a simplified block diagram of a universal telecommunications line card in accordance with the preferred embodiment of the present invention.

FIG. 1 is a simplified block diagram of a universal line card 100 serving subscriber line 101. Subscriber line 101 is interconnected to customer premises equipment 103. Universal line card 100 includes core circuitry comprising overvoltage protection element 102, test element 104, ringing current function 106 interconnected to ringing voltage generator 107, coin current function 108, supervision loop current monitor 110, battery feed/line driver 112 and hybrid element 114. The various BORSCHT functional elements of the core circuit are interconnected via bi-directional links 115A through 115G.

Also shown is variable termination impedance function 122 which is interconnected to hybrid element 114 via link 123 and to the control processor described below. Codec functionality is contained in circuit 124 which is interconnected to hybrid function 114, control processor 130 and processing system 140.

Control processor 130 is linked to test element 104, ring element 106, coin current element 108, supervision element 110 and battery element 112 via links 131, 133, 135, 137 and 139, respectively. Control processor 130 is also interconnected to variable termination impedance element 122 and codec 124 via links 141 and 143, respectively.

Control processor 130 is also interconnected to configuration system 200 which provisions the subscriber loop standard line cards. In this embodiment, control processor 130 is shown interconnected to a single line card but in alternative embodiments, this control processor serves a plurality of line card units. During operation, control processor 130 determines which elements and protocol should be deployed for the requested subscriber loop standard for a particular line circuit or line card. For example, configuration of a line card to operate in an ISDN mode would require processing system 140 to use an ISDN operating protocol (e.g., ISDN specific bit rates, bandwidth tolerances). The ISDN protocol also requires disabling elements 106, 108, 110 of the core circuitry and enabling and configuring elements 102, 104, 112, 114, 122, 124 and 140. Upon receiving instructions for ISDN operation of a line card, control processor 130 issues a command to processing system 140 which adopts the appropriate protocols and initiates enablement/disablement of elements in the line card.

Processing system 140 includes digital signal processor 142 interconnected to algorithm storage memory 144 and core network interface 146 via bi-directional links 145 and 147, respectively. Digital signal processor 142 is also interconnected to codec circuit 124 via bi-directional link 149. In this embodiment, algorithm storage memory 144 stores operational protocols associated with the various subscriber loop standards which the universal line card can deploy. More particularly, digital signal processor 142 operates at different speeds (that is, different bit rates and processing speed) depending on the type of subscriber loop standard being deployed by the universal line card which it serves. Algorithm storage memory 144 stores the various protocols associated with each subscriber loop standard and directs a digital signal processor with appropriate instructions. Preferably, the digital signal processor serves a plurality of line cards. Transmissions to the core (or serving telecommunications network) are accomplished via link 147 which could also serve a plurality of line cards.

Figure 2:
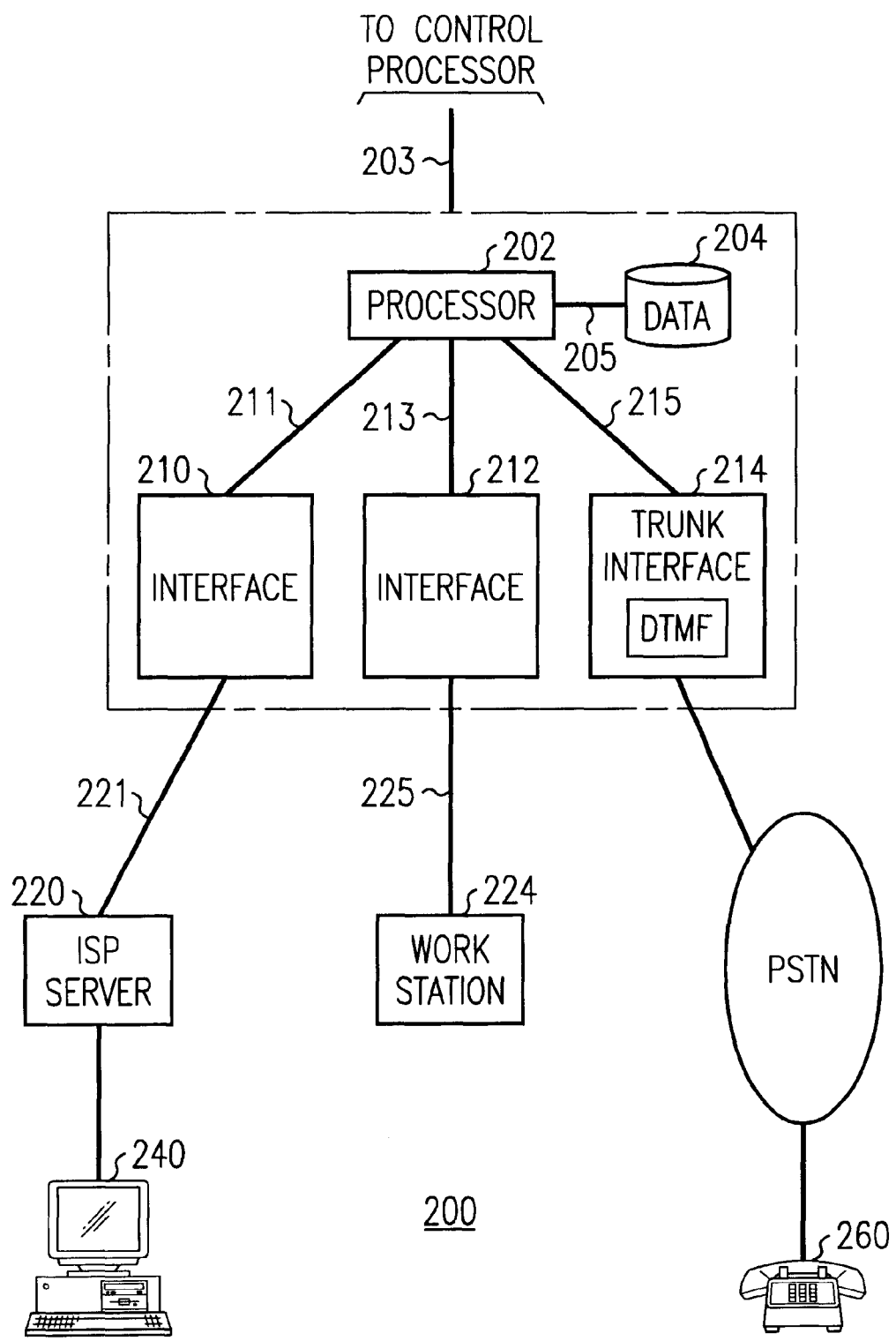
FIG. 2 is a simplified block diagram of the configuration system for provisioning a universal telecommunications line card in accordance with the preferred embodiment of the present invention.

FIG. 2 is a more detailed block diagram of a configuration system which serves a plurality of line cards, including universal line card 100 shown in FIG. 1. In this embodiment, configuration system 200 is interconnected to control processor 130 via link 203. Link 203 carries all transmission and requirements issued by the configuration system, and also transmits alarm signals and requests from the universal line card to the configuration system via control processor 130.

Configuration system 200 comprises central processor 202 interconnected to database 204 via link 205 and a plurality of network interfaces 210, 212 and 214 which are linked to the processor via links 211, 213 and 215, respectively. In this example, interface 214 is a trunk interface with DTMF processing capability. The configuration system receives input from a plurality of sources. For example, an end user at personal computer 240 may access the system via a third party server, such as third party host server 220 interconnected to the configuration system via link 221. Alternatively, a telecommunications service provider technician may remotely provision and maintain line cards via a workstation access to the configuration system. In this embodiment, workstation 224 is interconnected to the configuration system via link 225 and interface 212. Also, the configuration system may be remotely accessed via the public switched telephone network (PSTN) and trunk interface 214. A call from telephone 260 may be placed to configuration system trunk interface 214 via PSTN to input instructions for changing the configuration of a particular universal line card. For example, DTMF tones may be used to identify a particular line card and issue responses to a menu driven provisioning protocol so that an end user may request and effect changes to subscriber line services.

Significantly, the universal line card can also automatically issue changes when errors or operational problems are detected. For example, if a particular line card is to operate in ADSL mode but some malfunction is occurring, the line card can issue a default mode operation request to the configuration system via the control processor so that the line card can be temporarily configured to operate in POTS mode until the malfunction is corrected. In this manner, configuration system 200 works in conjunction with universal line card 100 to create an intelligent provisioning and operational system which requires minimal labor for maintenance and provisioning.

Figure 3:
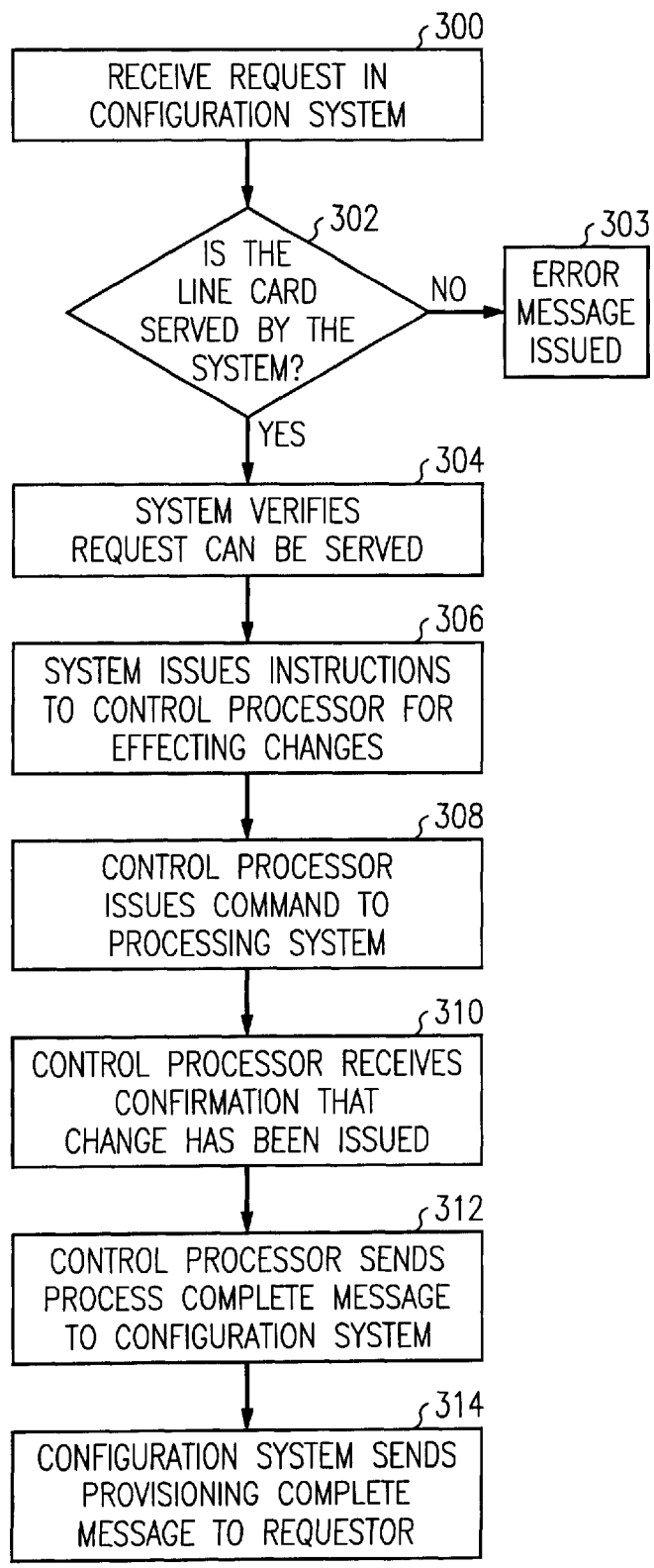
FIG. 3 is a flow diagram depicting the steps performed by the configuration system of FIG. 2 for configuring a line card.

FIG. 3 is a flow diagram illustrating the steps performed by configuration system 200 as shown in FIG. 2 to accommodate a subscriber loop standard change request.

The process begins in step 300 in which the configuration system receives a provisioning request for relating to a universal line card which it serves. The provisioning request may enter the configuration system via one of a plurality of interfaces such as end user interface 210, telecommunications service provider interface 212, or PSTN interface 214. In decision step 302, the configuration system determines whether the universal line card identified in the provisioning request is served by this system. If the outcome of decision step 302 is a "NO" determination, the process continues to step 303 in which an error message is provided to the requester. If the outcome of decision step 302 is a "YES" determination, the process continues to step 304 in which the configuration system accesses its internal database for verifying that the requested service can be provided on the universal line card. In step 306, the configuration system processor issues a command to the control processor associated with the identified universal line card (e.g., control processor 130) including instructions for effecting the requested change. The command includes configuration instructions for the codec, core network interface and call processing functions. In step 308, the control processor issues the command to the processing system serving the universal line card requesting that a particular subscriber loop standard be implemented on the identified line card. In step 310, the control processor receives confirmation from the processing system that the subscriber loop standard has been implemented. In step 312, the control processor sends a process complete message to the configuration system indicating that the requested provisioning has been accomplished. In step 314, the configuration system issues a provisioning complete message to the requester indicating that the provisioning and maintenance of the identified line card has been accomplished.

Advantageously, a telecommunications service provider technician is not required to physically access a line card for altering the subscriber loop standard in which the line card operates. Further, the universal line card is capable of identifying malfunctions and automatically operating in a default mode when such malfunctions arise. The convenience associated with end user capability for universal line card provisioning may also contribute to enhanced efficiency for the telecommunications service provider.

It is to be understood that the above description is provided for illustrative purposes only. Numerous other arrangements may be devised by those skilled in the art without departing from the scope of the invention. The invention is thus limited only as defined in the accompanying claims.

What is claimed is:

1. A universal line card comprising:

core circuitry for performing battery, overvoltage, ringing, supervision, coder/decoder circuit (CODEC), hybrid and test (BORSCHT) functions;

a control processor interconnected to selected BORSCHT function circuitry for controlling such circuitry; and a processing system interconnected to the control processor and a coder/decoder circuit (codec) for operating the line card according to at least two subscriber loop standards, wherein the subscriber loop standards are selected from a group including POTS, ISDN, coin, HDSL, ADSL, VDSL, SDSL and 10 base T.

2. A universal line card comprising:

core circuitry adapted to perform hybrid and coder/decoder circuit CODEC functions;

a control processor connected to the core circuitry and adapted to receive a first control signal that defines a subscriber loop standard for the hybrid and CODEC functions;

the core circuitry adapted to additionally perform at least one or more of battery, overvoltage, ringing, supervision, and test functions, the first control signal defining the subscriber loop standard for said one or more functions;

the control processor adapted to transmit second control signals to the core circuitry based on receipt of the first control signal, the core circuitry adapted to function in accord with the defined subscriber loop standard of operation based on the second control signals;

a processing system connected to the control processor and the codec adapted to operate the codec according to the defined subscriber loop standard of operation;

the control processor being adapted to detect a malfunction associated with the subscriber loop standard of operation and further adapted to generate and transmit a request signal to a configuration system upon detection of the malfunction, the request signal representing a request for the configuration system to issue another first signal to the control processor to change the subscriber loop standard of operation to another standard of operation.

3. The universal line card of claim 2 wherein, the control processor is adapted to receive the another first signal and generate another second control signal thereby changing the subscriber loop standard of operation to another subscriber loop standard of operation.

4. The universal line card of claim 2 wherein the processing system includes a digital signal processor adapted to operate in accordance with each of the subscriber loop standards.

5. The universal line card of claim 2 further comprising a memory adapted to store algorithms relating to the various protocols associated with the subscriber loop standards in which the line card can operate.

6. The universal line card of claim 2 further comprising an interface to a core network adapted to establish connections between customer premises equipment served by the universal line card and the public switched telephone network.

7. The universal line card of claim 2 wherein the subscriber loop standards are selected from a group including POTS, ISDN, coin, HDSL, ADSL, VDSL, SDSL and 10 base T.

* * * * *

UNITED STATES PATENT AND TRADEMARK OFFICE
CERTIFICATE OF CORRECTION

PATENT NO.   : 6,694,015 B1
DATED        : February 17, 2004
INVENTOR(S)  : Charles Calvin Byers, Mark Alan Lassig and Carl Robert Posthuma It is certified that error appears in the above-identified patent and that said Letters Patent is hereby corrected as shown below:

<u>Title page,</u>
Insert Item -- [73] Assignee: Lucent Technologies Inc., Murray Hill, N.J. --

Signed and Sealed this

Twenty-seventh Day of July, 2004

JON W. DUDAS
*Acting Director of the United States Patent and Trademark Office*